(12) United States Patent
Le Garrec et al.

(10) Patent No.: US 8,505,827 B2
(45) Date of Patent: Aug. 13, 2013

(54) MICROCIRCUIT CARD INCLUDING A LUMINOUS MEANS

(75) Inventors: Loïc Le Garrec, Vitre (FR); Denis Vere, Argentre du Plessis (FR)

(73) Assignee: Oberthur Technologies, Levallois Perret (FR)

( * ) Notice: Subject to any disclaimer, the term of this patent is extended or adjusted under 35 U.S.C. 154(b) by 0 days.

(21) Appl. No.: 13/224,582

(22) Filed: Sep. 2, 2011

(65) Prior Publication Data

US 2012/0061476 A1  Mar. 15, 2012

(30) Foreign Application Priority Data

Sep. 2, 2010  (FR) ..................... 10 56974

(51) Int. Cl.
| | | |
|---|---|---|
| G08B 13/14 | (2006.01) | |
| G05B 19/00 | (2006.01) | |
| G06K 19/00 | (2006.01) | |
| G06K 19/06 | (2006.01) | |
| G06K 5/00 | (2006.01) | |
| G06K 15/00 | (2006.01) | |
| G07F 19/00 | (2006.01) | |
| G07D 11/00 | (2006.01) | |
| G06Q 40/00 | (2012.01) | |

(52) U.S. Cl.
USPC ........... 235/492; 235/487; 235/493; 235/379; 235/378; 235/380; 340/572.1; 340/574.1; 340/572.8; 340/5.32; 340/5.6

(58) Field of Classification Search
USPC ................. 235/487, 492, 493, 379, 378, 380; 340/572.1, 572.4, 572.8, 5.32, 5.6
See application file for complete search history.

(56) References Cited

U.S. PATENT DOCUMENTS

| | | | | |
|---|---|---|---|---|
| 4,400,616 | A | * | 8/1983 | Chevillat et al. ............... 235/487 |
| 4,682,794 | A | * | 7/1987 | Margolin ........................ 283/82 |
| 4,990,759 | A | * | 2/1991 | Gloton et al. ................. 235/492 |
| 5,345,367 | A | * | 9/1994 | Pierce et al. ................... 362/555 |
| 5,736,727 | A | * | 4/1998 | Nakata et al. ................. 235/487 |
| 5,959,289 | A | * | 9/1999 | Okada et al. .................. 235/487 |
| 6,193,156 | B1 | * | 2/2001 | Han et al. ....................... 235/454 |
| 6,406,935 | B2 | * | 6/2002 | Kayanakis et al. ........... 438/106 |
| 6,547,135 | B2 | * | 4/2003 | Solirenne et al. ............. 235/382 |
| 6,719,206 | B1 | * | 4/2004 | Bashan et al. ................. 235/492 |
| 6,786,419 | B2 | * | 9/2004 | Kayanakis ..................... 235/492 |
| 2001/0010333 | A1 | * | 8/2001 | Han et al. ....................... 235/454 |
| 2001/0040801 | A1 | * | 11/2001 | Krietzman et al. ........... 362/200 |
| 2002/0033419 | A1 | * | 3/2002 | Solirenne et al. ............. 235/492 |
| 2002/0133713 | A1 | * | 9/2002 | Fieschi et al. ................. 713/200 |
| 2003/0034400 | A1 | * | 2/2003 | Han et al. ....................... 235/487 |
| 2003/0052177 | A1 | * | 3/2003 | Halope .......................... 235/492 |
| 2003/0106935 | A1 | * | 6/2003 | Burchette, Jr. ................ 235/380 |
| 2003/0201331 | A1 | * | 10/2003 | Finkelstein .................... 235/487 |

(Continued)

FOREIGN PATENT DOCUMENTS

EP   1 847 946   10/2007
JP   62009487 A * 1/1987

(Continued)

*Primary Examiner* — Daniel Walsh
(74) *Attorney, Agent, or Firm* — Cozen O'Connor

(57) ABSTRACT

The microcircuit card (10) comprising a body (12) delimiting an edge (14) of the card (10). The body (12) incorporates a luminous means (16) capable of illuminating at least partially the edge (14) of the card (10).

13 Claims, 1 Drawing Sheet

(56) References Cited

U.S. PATENT DOCUMENTS

| | | | |
|---|---|---|---|
| 2004/0222505 A1* | 11/2004 | Laackman et al. | 257/679 |
| 2005/0087606 A1* | 4/2005 | McCumber | 235/491 |
| 2005/0139685 A1* | 6/2005 | Kozlay | 235/492 |
| 2006/0060656 A1* | 3/2006 | Waters | 235/487 |
| 2006/0124753 A1* | 6/2006 | Scholz et al. | 235/492 |
| 2006/0289632 A1* | 12/2006 | Walker et al. | 235/380 |
| 2007/0272761 A1* | 11/2007 | Ayala et al. | 235/492 |
| 2008/0217414 A1* | 9/2008 | Ito | 235/492 |
| 2008/0223937 A1* | 9/2008 | Preta et al. | 235/492 |
| 2008/0296606 A1* | 12/2008 | Ottobon et al. | 257/100 |
| 2009/0015411 A1* | 1/2009 | Li | 340/572.1 |
| 2009/0065589 A1* | 3/2009 | Korhonen et al. | 235/492 |
| 2009/0109701 A1* | 4/2009 | Hsieh et al. | 362/604 |
| 2009/0159712 A1* | 6/2009 | Mullen et al. | 235/493 |
| 2009/0206164 A1* | 8/2009 | Kluge | 235/492 |
| 2009/0245029 A1* | 10/2009 | Kam | 368/10 |
| 2009/0315320 A1* | 12/2009 | Finn | 283/107 |
| 2010/0001077 A1* | 1/2010 | Kluge | 235/488 |
| 2010/0176205 A1* | 7/2010 | Patrice | 235/492 |
| 2010/0224685 A1* | 9/2010 | Aoki | 235/488 |
| 2010/0308976 A1* | 12/2010 | Seban et al. | 340/10.5 |
| 2011/0025463 A1* | 2/2011 | Palmade et al. | 340/10.1 |
| 2011/0037607 A1* | 2/2011 | Vere et al. | 340/815.45 |
| 2011/0174874 A1* | 7/2011 | Poznansky et al. | 235/379 |
| 2012/0037710 A1* | 2/2012 | Le Garrec et al. | 235/492 |
| 2012/0055999 A1* | 3/2012 | Le Garrec et al. | 235/492 |
| 2012/0061476 A1* | 3/2012 | Le Garrec et al. | 235/492 |
| 2012/0138691 A1* | 6/2012 | Bosquet et al. | 235/492 |

FOREIGN PATENT DOCUMENTS

| | | | |
|---|---|---|---|
| JP | 62134780 A | * | 6/1987 |
| JP | 2004 094561 | | 3/2004 |
| JP | 2004094561 A | * | 3/2004 |
| JP | 2004 265176 | | 9/2004 |
| JP | 2004265176 A | * | 9/2004 |
| JP | 2005216044 A | * | 8/2005 |
| JP | 2005293181 A | * | 10/2005 |
| WO | WO 2005/071606 | | 8/2005 |

* cited by examiner

MICROCIRCUIT CARD INCLUDING A LUMINOUS MEANS

The present invention relates to the field of microcircuit cards including at least one luminous means.

Conventionally, a microcircuit card includes a card body delimiting the outside dimensions of the card, complying for example with the ID-1 format of banking cards defined by the ISO 7816 standard.

It applies more particularly but not specifically to the field of chip cards including a magnetic near-field communication antenna, consisting for example of a winding of a plurality of electrically conductive turns, incorporated into the card, allowing the establishment of so-called "contactless" communication with a contactless card reading device.

Such cards can be of the "contactless" type, having only a "contactless" interface, or of the "dual interface" type having two interfaces: a first "contactless" interface and a second interface using external electrical contacts to establish so-called "contact" communication.

In these two types of chip card, the body of the card generally incorporates an antenna circuit comprising the near-field communication antenna and a microcircuit connected electrically to the two ends of the antenna. The microcircuit thus constitutes a communication module, also called an NFC (Near Field Communication) module.

A bearer of such a card can gain access to various wireless services, such as for example secure electronic payment services, door opening services, or can exchange information with a contactless card reading device compatible with NFC technology.

To use this kind of service or to exchange information, the user brings his mobile terminal near such a reading device, such as for example a payment terminal or a ready access terminal, so that near-field communication can be established.

It is known in the state of the art to equip such cards with an indicator light capable of lighting when near-field communication is established. This makes it possible in particular to inform the user of the card of the successful progress of the communication, or conversely of its failure.

The indicator light comprises for example a light-emitting diode capable of emitting light when a current of a predefined intensity passes through it, located on one of the faces of the card.

The diode is then connected to the antenna circuit in such a way that, when the card is placed in proximity to a contactless card reader or inserted into a contact card reader, a current circulates in the antenna circuit causing light emission by the diode.

The indicator light is generally positioned on one of the outside faces of the card.

This positioning, however, has certain disadvantages. Indeed, in contact mode, the card is generally partially inserted into a card reader and the indicator light is sometimes masked within the reader and the user is not informed of the progress of the communication.

Additionally, in contactless mode, the indicator light generally illuminates only one side of the card, which is also troublesome, the user sometimes being obliged to turn the card over to verify the correct progression of the communication.

The invention has as a particular goal to propose an indicator-light-equipped card designed for use in contact or contactless mode.

To this end, the invention has as its object a microcircuit card comprising a body delimiting an edge of the card, the body incorporating a luminous means capable of illuminating at least partially the edge of the card.

The invention exploits the fact that the majority of contact card readers leave the edge of the card exposed. The illumination of the edge is also especially esthetic and conspicuous. Indeed, when the edge of the card is illuminated, the user has a general impression of a color change in the card which is especially remarkable.

Preferably, the card can comprise two light sources having two distinct colors indicating two distinct communication states.

A card according to the invention can additionally include one or more of the following features:
- the body includes a region, capable of transmitting the light emitted by the luminous means, extending at least partially along the edge, the luminous means being arranged within the body so as to illuminate the edge of the body by way of this region;
- the transmission region is made of a first material and is surrounded at least partially by a second material, the materials being selected in such a way to constitute an optical waveguide in at least one direction;
- the body consisting of a stack of layers extending through the body, the transmission region constituting one of the layers of the stack;
- the luminous means is arranged within the transmission region;
- the luminous means is optically concealed between the first and second faces of the card;
- the card includes a module comprising the microcircuit and the luminous means, the body including a cavity for receiving the module;
- the cavity is made partially within the thickness of the transmission region so that the luminous means extends at least partially into the interior of the transmission region;
- the module comprises a substrate delimiting a first face designed to be visible and a second, opposite face destined to face the cavity, the second face bearing at least the luminous means;
- the card includes a near-field communication antenna connected to the microcircuit and to the luminous means;
- the card includes first and second near-field communication antennas connected respectively to the microcircuit and to the luminous means;
- the card includes a module comprising the microcircuit and the luminous means, the antenna or antennas being incorporated into the module;
- the luminous means is connected electrically to an external power supply contact extending over the card and capable of making contact with an external contact card reader;
- the luminous means is capable of being controlled according to the communication state of the microcircuit;
- the card includes first and second luminous means capable of being controlled according to the first and second communication states of the microcircuit;
- the card is a microcircuit card of the contactless, dual or contact type.

The device which incorporates the module of the invention may have a thickness of 0.76 mm (corresponding to ISO 7816 format) +/−10%.

Other features and advantages of the invention will appear in the light of the description that follows, made with reference to the appended drawings in which.

Figure 1:
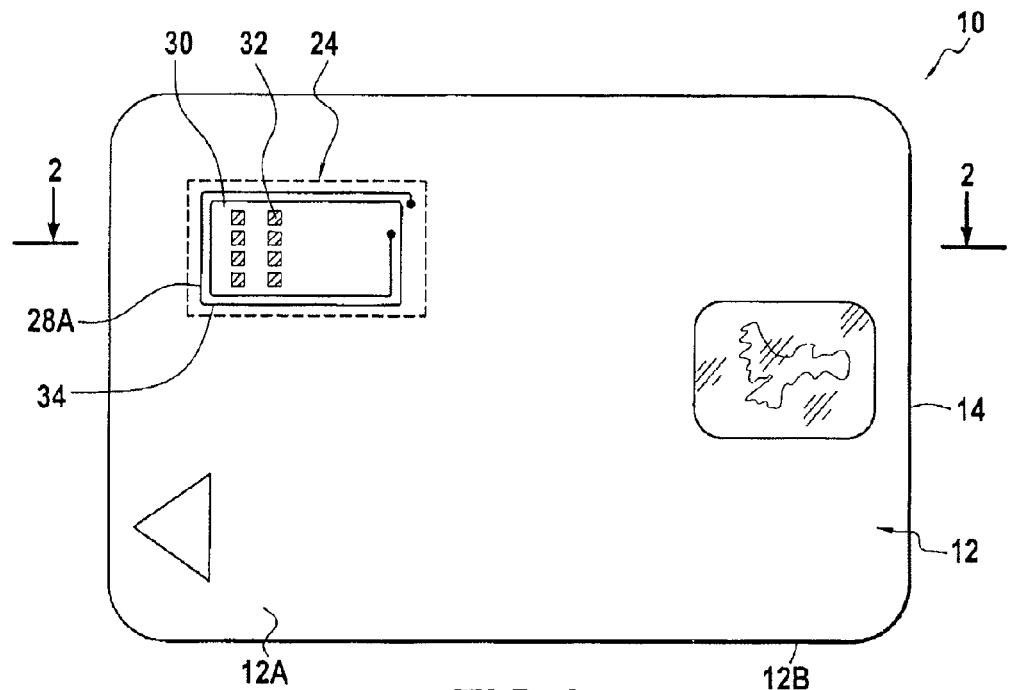
FIG. 1 is a top view of a microcircuit card according to the invention.

A microcircuit card according to the invention is shown in FIG. 1. This card is assigned the overall reference number 10.

As illustrated in FIG. 1, the card 10 comprises a body 12 in the general shape of a card delimiting first 12A and second 12B opposite faces. In addition, the body 12 delimits on its periphery an edge 14 of the card 10. This edge is defined as being the outer peripheral edge surrounding the card 10.

In this embodiment, the body 12 delimits the outer dimensions of the card 10. In this example and by preference, the dimensions of the card are defined by the ID-1 format of the ISO 7816 standard which is the format conventionally used for banking cards with dimensions of 86 millimeters by 54 millimeters. Of course, other card formats can be used within the scope of the invention, such as for example the ID-000 card format of the same standard.

In conformity with the invention, the body 12 incorporates the indicator light 16 capable of at least partially illuminating the edge 14 of the card 10, from the inside.

To this end, preferably, the body 12 comprises at least one region 18 capable of transmitting, in the thickness of the card, the light emitted by the indicator light 16. In other words, the luminous means 16 is arranged within the body 12 to illuminate the edge 14 of the card 10 by way of this transmission region 18.

Preferably, the transmission region 18 is made of a first material and at least partially surrounded by a second material different from the first material.

In this example, the body 12 consists of a stack of layers extending through the body 12 and the transmission region 18 constitutes one of the layers of the stack.

Figure 2:
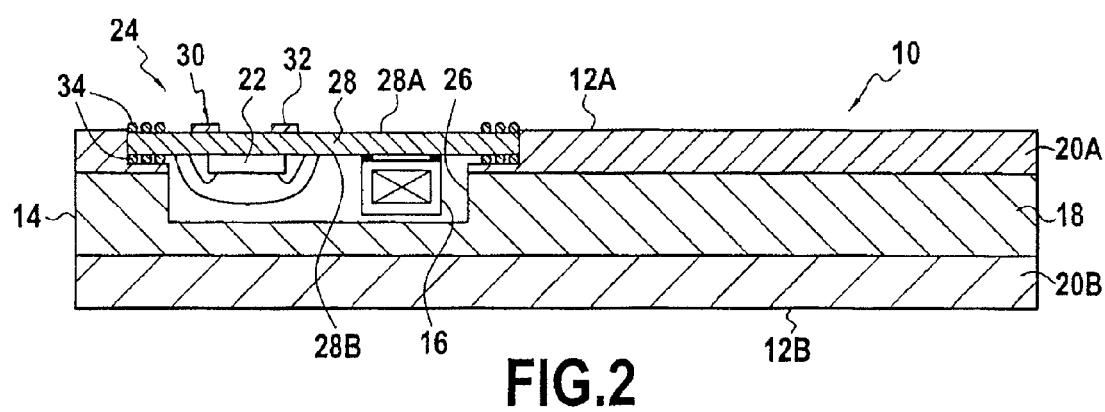
FIG. 2 shows a section view of the card of FIG. 1 along the line 2-2 of the same figure.

As illustrated in FIG. 2, the body 12 comprises a stack of at least three layers: a central layer 18 constituting a transmission region interleaved between at least two external layers 20A, 20B made of the second material, these two external layers constituting a so called peripheral region.

Thus, preferably, the body 12 is formed by lamination, that is by formation, for example by means of a press and in a hot laminating operation, of the stack of layers or laminated sheets made for example of a thermoplastic material.

Of course, in a variation that is not illustrated, the body 12 can be formed by molding, from plastic for example.

The materials are chosen so that the transmission and peripheral regions 18, 20A, 20B constitute an optical waveguide in at least one direction.

The transmission layer 18 is made for example of polycarbonate. Possibly, the layer can also be made of a material supplied as a film of glass fibers such as compounds of the LGF (Light Guide Film) type based for example on polyurethane or acrylic.

For example, the peripheral layers 20A, 20B surrounding the polycarbonate layer are made of PVC (polyvinyl chloride).

Preferably, in order to optimize the optical guidance of the waves, the material of the transmission layer 18 has an index of refraction greater than the index of refraction of the materials constituting the two external layers 20A, 20B surrounding the transmission layer 18.

Preferably, the means 16 emits in the visible spectrum.

Preferably, the two external layers 20A, 20B are opaque. This makes it possible in particular to highlight the illumination of the edge of the card 10.

In a preferred embodiment, the luminous means 16 is optically concealed between the two faces 12A, 12B of the card 10.

As illustrated in FIG. 2, it is seen that the luminous means 16 is preferably arranged inside the transmission region 18.

Thus, in the preferred embodiment of the invention, the card 10 comprises a microcircuit 22 capable of exchanging, processing and/or storing data. In a preferred embodiment, the body 12 includes a microcircuit module 24 incorporating the microcircuit 22.

For example, preferably, the body 12 includes a cavity 26 for receiving the module 24, this cavity 26 being made at least partially within the thickness of the transmission region 18, so that the luminous means 16 extends at least partially into the transmission region 18 when the module 24 is housed in the cavity 26.

For example, the module 24 comprises a substrate 28 delimiting an outer face 28A designed to be visible and a masked inner face 28B designed to be facing the cavity 26 and bearing the microcircuit 22 as well as the luminous means 16.

Thus, preferably, the luminous means 16 is optically hidden within the card between the two faces 12A, 12B of the card 10. However, the luminous means 16 can be observed from the edge 14 of the card 10.

In the case where the substrate 28 is translucent and allows the light of the means 16 to pass, an optical mask can be arranged on the substrate 28 substantially in line with the luminous means 16. A design can for example be printed on the visible face 28A of the substrate 28 to mask the light emitted by the source 16. As a variation, an opaque substrate 28 can also be selected.

However, the illumination of the module 24 by the source 16 can also be exploited to contribute an additional esthetic or technical effect.

In the preferred embodiment of the invention, the card 10 is of the dual type, that is it allows both contact communication and contactless communication.

To this end, the microcircuit module 24 also includes a contact interface 30 electrically connected to the microcircuit 22. This interface allows the establishment of contact communication by the card 10, when the latter is inserted into a matching card reader. The interface 10 is for example borne by the outer face 28A of the substrate 28 of the module 24.

This interface 30 comprises for example a series of metal electrical contact pads 32, complying with a predefined microcircuit card standard. For example, the contact pads are compliant with the ISO 7816 standard. In this embodiment, the contact pads 32 of the interface 30 correspond to the contacts C1 through C8 of the ISO 7816 standard.

The interface 30 of the card 10 is preferably made of a layer of metallic material such as copper, but can also be made, as a variation, by silkscreening of conductive ink of the type consisting of epoxy ink filled with particles of silver or gold or by silkscreening of an electrically conductive polymer.

Preferably, the pads are electrically connected to the microcircuit by electrically conductive wires such as for example gold wires passing through vias made in the substrate of the module, connected in their turn to electrically conductive connecting traces extending over the inner face of the substrate. These traces have not been shown in FIG. 2.

For establishing contactless communication with an external terminal, such as an external reader, the card 10 also includes at least one near-field communication antenna 34.

In conformity with the invention, the antenna 34 is preferably connected to the microcircuit 22 and is able to supply power to the microcircuit 22 by electromagnetic coupling with an external terminal (not shown).

The communication frequency of the microcircuit with the external terminal is preferably the 13.56 MHz communication frequency defined by the ISO 14 443 standard.

Preferably, the antenna 34 is also connected to the indicator light 16 to supply it with power.

In one variation of the invention, the card 10 includes a first and second antennas connected respectively to the microcircuit 22 and to the luminous means 16. For example, the antenna 34 extends into the interior of the module 24. Preferably, the antenna 34 extends over the substrate 28, for example on the two opposite faces of the substrate, so that the antenna 34 is partially visible from the outside.

Preferably, the light source 16 is a light-emitting diode. As is known per se, a diode is an electronic component capable of emitting light when an electrical current passes through it. Preferably, the diode is of the SMC or surface-mount component type.

Thus, in conventional fashion, a surface-mount component can be applied to the substrate of a printed circuit by adhesive bonding, by brazing or by soldering, unlike a component provided with pins, the assembly whereof to the substrate requires making holes in the substrate to allow passage of the pins.

In the example illustrated in FIG. 2, the diode 16 is assembled to the substrate 28 of the module 24 by brazing. For example, the antenna 34 is connected to the luminous means 16 and in this case the luminous means 16 is supplied with power by the antenna 34.

In one variation, the luminous means 16 is electrically connected to an external power supply contact extending over the card 10, for example one of the power supply contacts of the interface 30 of contacts 32.

Preferably, the luminous means 16 is capable of being controlled according to the communication state of the microcircuit 22, for example according to the state of a transaction.

As a variation, the card 10 can be solely of the contactless type; in this case, the card 10 is preferably not equipped with the external contact interface. In another variation, the card 10 can be solely of the contact type and in this case, the card 10 is not equipped with the near-field communication antenna.

In another embodiment of the invention not illustrated in the figures, the card 10 can include at least two luminous means. For example, the two luminous means can be controlled according to first and second communication states of the microcircuit.

This makes it possible for the user to detect in a remarkable way two distinct communication states of the microcircuit which, in some applications, can allow a reduction in errors on the user's part in selecting applications, particularly when the card is operating in contact mode and is inserted into a card reader.

Indeed, in that case, the user clearly perceives the change in color of the card since the latter is illuminated along its edge.

The principal aspects of the card's operation illustrated by FIGS. 1 and 2 will now be described.

Initially, the user is out of range of the external contact terminal. When he moves the card close to the external terminal, the card illuminates along the edge. This change in state of the card is immediately perceived by the user.

In addition, when the user inserts the card in a contact card reader, the indicator light is supplied with power via the contact interface 30 and the edge of the part of the card extending outside the card reader is also illuminated.

It is understood that the embodiments that have just been described are in no way limiting in nature and that they can undergo any desirable modification without thereby departing from the scope of the invention.

In particular, the luminous means can be incorporated into the body. For example, the luminous means is connected to a near-field communication antenna to supply it with power, the assembly being arranged on one layer of a stack of layers laminated together constituting the body of the card.

The invention claimed is:

1. A microcircuit card comprising a body delimiting an edge of the card, said card comprising:
    a luminous means inside the card configured to illuminate at least partially said edge of the card, light emitted by the luminous means being transmitted in a thickness of the body up to said edge by way of a transmission region of the body made of a first material and surrounded at least partially by a second material different from the first material, the first and second materials constituting an optical waveguide for said light; and
    first and second near-field communication antennas connected respectively to the microcircuit card and to the luminous means;
    wherein the first near-field communication antenna is configured to supply power to the microcircuit card and the second near-field communication antenna is configured to supply power to the luminous means; and
    wherein the body consists of a stack of layers, the transmission region constitutes one of the layers of the stack which is a central layer interleaved between at least two external layers made of the second material.

2. The card according to claim 1, wherein the luminous means is arranged within the transmission region.

3. The card according to claim 2, wherein the luminous means is optically concealed between first and second faces of the card.

4. The card according to claim 1, further including:
    a module comprising the microcircuit card and the luminous means, the body including a cavity for receiving the module.

5. The card according to claim 4, wherein the cavity is made at least partially within a thickness of the transmission region so that the luminous means extends at least partially into the transmission region.

6. The card according to claim 4, wherein the module comprises a substrate delimiting a first face designed to be visible and a second face designed to face the cavity, the second face bearing at least the luminous means.

7. The card according to claim 1, further comprising:
    a near-field communication antenna connected to the microcircuit card and to the luminous means;
    wherein the near-field communication antenna is configured to supply power to the microcircuit card and the luminous means.

8. The card according to claim 4, wherein the module incorporates at least a near-field communication antenna connected to the microcircuit or a near field communication antenna connected to the luminous means.

9. The card according to claim 1, wherein the luminous means is directly connected to an external power supply contact operable to draw power via contact with an external contact type card reader, said contact extending over the card.

10. The card according to claim 1, wherein the luminous means is controlled according to a communication state of the microcircuit card.

11. The card according to claim 10, further including:
    first and second luminous means controlled according to first and second communication states of the microcircuit card.

12. The card according to claim 1, wherein the microcircuit card is one of a contactless, dual and contact type microcircuit card.

13. A microcircuit card comprising a body delimiting an edge of the card, said card comprising:

a luminous means inside the card configured to illuminate at least partially said edge of the card, light emitted by the luminous means being transmitted in a thickness of the body up to said edge by way of a transmission region of the body made of a first material and surrounded at least partially by a second material different from the first material, the first and second materials constituting an optical waveguide for said light; and an external power supply contact directly connected to the luminous means and operable to draw power via contact with an external contact type card reader, said contact extending over the card;

wherein the body consists of a stack of layers, the transmission region constitutes one of the layers of the stack which is a central layer interleaved between at least two external layers made of the second material.

* * * * *